Figure 1:
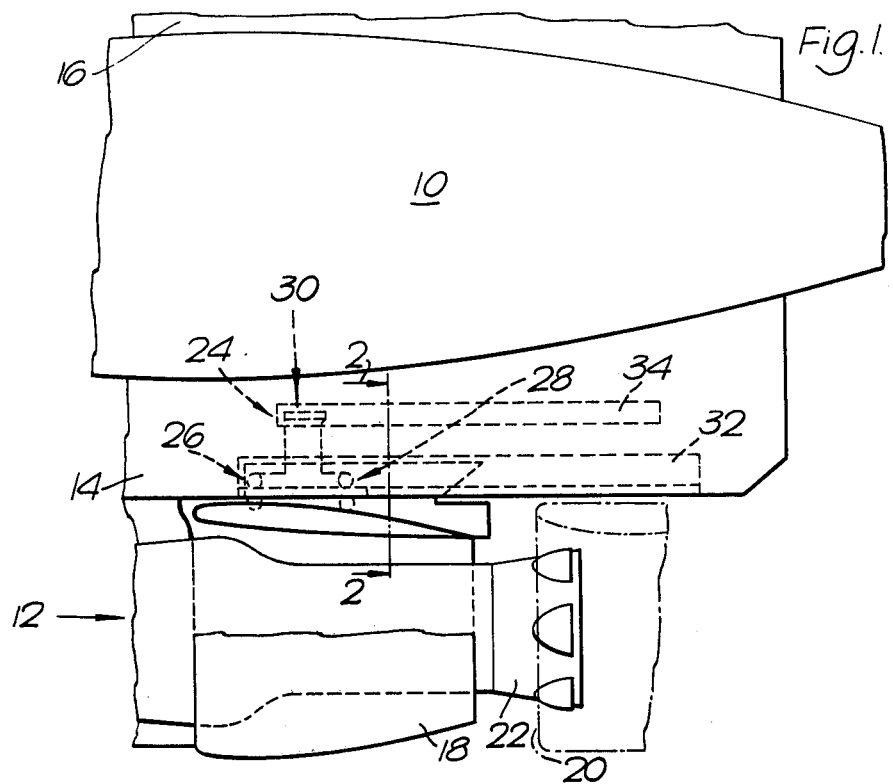

United States Patent [19]

Rodgers

[11] 4,049,220
[45] Sept. 20, 1977

[54] EJECTOR SLEEVES FOR AIRCRAFT MOUNTED GAS TURBINE ENGINES

[75] Inventor: Leonard John Rodgers, Spondon, England

[73] Assignee: Rolls-Royce Limited, London, England

[21] Appl. No.: 718,470

[22] Filed: Aug. 30, 1976

[30] Foreign Application Priority Data

Sept. 12, 1975 United Kingdom ............... 37534/75

[51] Int. Cl.$^2$ ...................... B64D 33/06; B64D 29/00
[52] U.S. Cl. ............................ 244/53 R; 239/265.13; 239/265.31; 181/216; 244/110 B; 244/54
[58] Field of Search ................... 244/53 R, 54, 110 B, 244/1 N; 181/33 HB, 33 HC, 33 HD; 104/121, 89; 105/148, 154, 155; 239/265.13, 265.31

[56] References Cited

U.S. PATENT DOCUMENTS

| 560,141 | 5/1896 | Malone | 104/121 X |
| 1,703,496 | 2/1929 | Naud et al. | 105/154 X |
| 2,972,860 | 2/1961 | Moy | 181/33 HD X |
| 3,084,507 | 4/1963 | Kleinhans et al. | 181/33 HD X |
| 3,516,511 | 6/1970 | Urquhart | 181/33 HC X |
| 3,790,001 | 2/1974 | Schnell | 105/148 X |

*Primary Examiner*—Trygve M. Blix
*Assistant Examiner*—Galen L. Barefoot
*Attorney, Agent, or Firm*—Cushman, Darby & Cushman

[57] ABSTRACT

An aircraft jet propulsion power plant is fitted with a sliding ejector sleeve for the provision by selection, of an auxiliary flow of ambient air within the sleeve so as to quieten the noise of the gas efflux. The sleeve is mounted independently of the power plant and is supported from a side of the aircraft fuselage. The sleeve mounting structure has an arm which projects into the fuselage to provide a further mounting point, the reaction loads of which act downwardly so as to counteract the downwardly acting weight of the cowl on the side mounting.

2 Claims, 3 Drawing Figures

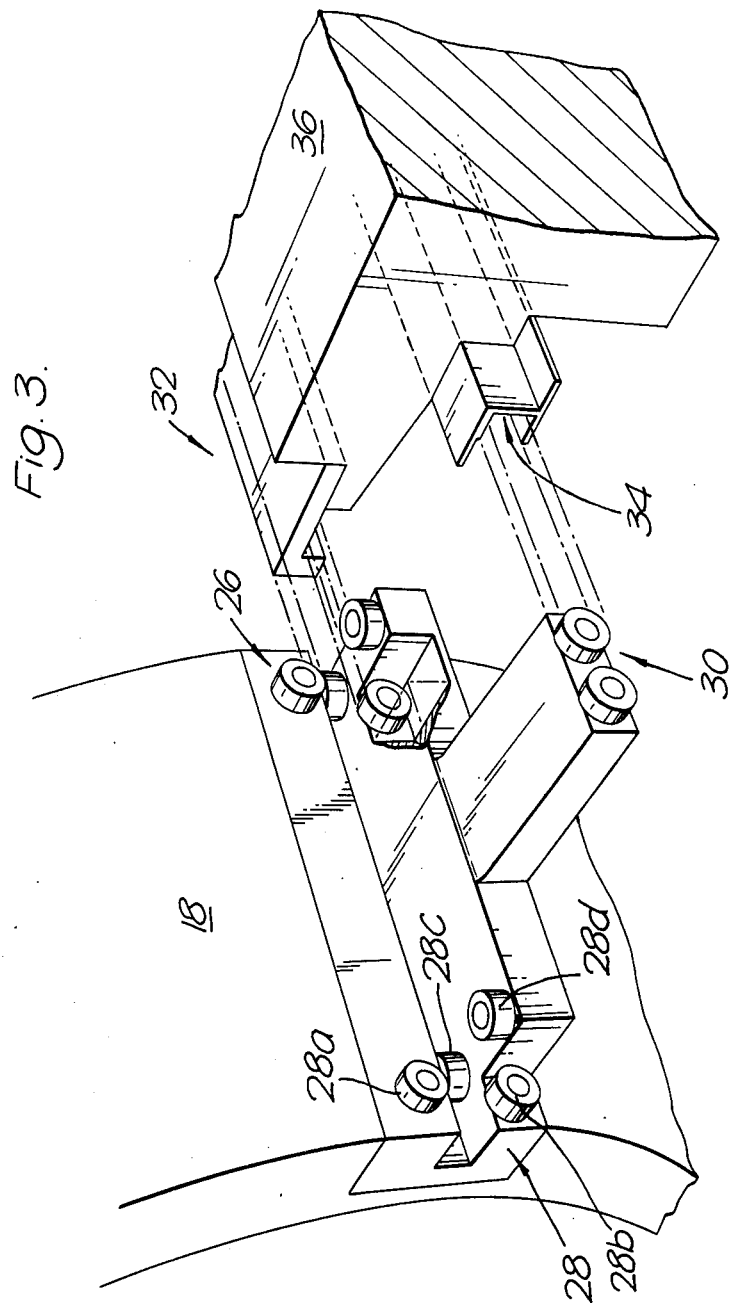

EJECTOR SLEEVES FOR AIRCRAFT MOUNTED GAS TURBINE ENGINES

This invention concerns ejector sleeves for aircraft mounted gas turbine engines.

The present invention comprises, in combination, aircraft structure and an ejector sleeve adapted for dependence from said aircraft structure and which is movable relative thereto, between a position wherein it surrounds a gas turbine engine which in use is also mounted on said aircraft structure, and a position wherein its upstream end overlaps the plane of the gas turbine engine nozzle in radially spaced apart relationship therewith, and wherein the ejector sleeve support means comprises an arm rigidly attached to the sleeve and which bears track engaging means which engage a pair of parallel tracks formed in said aircraft structure at a first position adjacent to sleeve and a second position adjacent the free extremity of the arm, the arrangement being such that the track engaging means adjacent the free extremity of the arm counteract any bending moment exerted by the weight of the sleeve on the rack adjacent the sleeve. Preferably said aircraft structure comprises a stub wing mountable on an aircraft fuselage and includes said pair of parallel tracks.

Said track engaging means which engage said first track comprise two groups of rollers spaced from each other longitudinally of the sleeve, each group comprising four rollers each of which locates on a respective face of said first track in a manner which prevents said sleeve bodily rotating in planes which contain its longitudinal axis.

Figure 2:
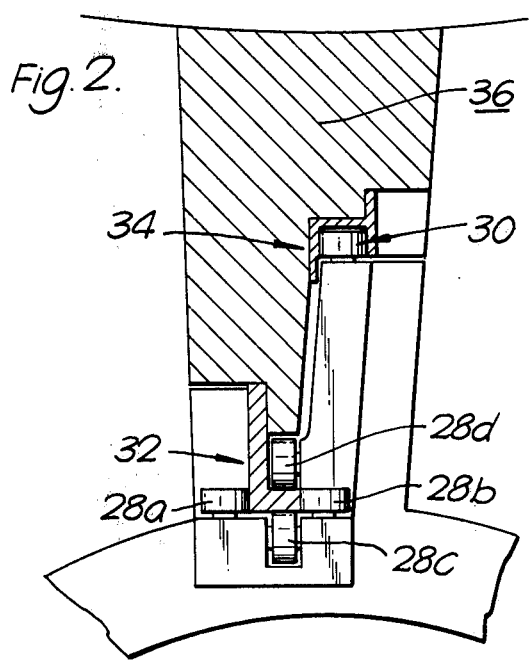

The invention will now be described by way of example, with reference to the accompanying drawings in which:

FIG. 1 is a diagrammatic plan view of an ejector sleeve and aircraft structure in accordance with an aspect of the invention, FIG. 2 is a view on line 2—2 of FIG. 1, but oriented 90° clockwise, and FIG. 3 is a pictorial view of ejector sleeve mounting structure in accordance with the invention.

In FIG. 1 an aircraft fuselage rear end is indicated by the numeral 10. The aircraft is powered by a pair of gas turbine engines 12, only one of which is shown, and which are mounted on stub wings 14, 16 which in turn are fixed by any convenient means, to the fuselage 10.

Each gas turbine engine 12 is provided with an ejector sleeve 18, which is translatable relative to the engine so as to provide an air intake 20 into which ambient air is induced, for explusion from the downstream end of the ejector sleeve after mixing with hot gases expelled from engine exhaust nozzle 22 which, in its downstream position the ejector just overlaps as shown in chain dotted lines.

The ejector sleeve 18 has no mechanical connection whatever with engine 10 but is supported solely from the stub wing. The supporting structure is indicated in dotted lines at 24 in FIG. 1, and comprises an arm which is T. shaped in plan view and has groups of rollers 26, 28 at each end of the "cross piece" of the T and a pair of rollers 30 at the extremity of the "leg" of the T. Roller groups 26, 28 are arranged to roll along a four sided track 32 and rollers 30 are arranged to roll along a track 34, tracks 32, 34 being parallel with each other and mounted on stub wing core structure 36.

Referring now to FIG. 2, roller group 28 comprises four rollers of which one pair 28a, 28b are engaging opposed upper and lower track surfaces and the remaining pair 28c, 28d are engaging laterally opposed track surfaces. Roller group 26 is similarly arranged further along the track with the result that the sleeve 18 is prevented from rotating about axes in the plane of the figure and normal to said plane. The roller arrangement 30 comprised a pair of rollers aligned in tandem and these bear upwardly as viewed in FIG. 2, onto the undersurface of elongate track 34. The equal and opposite reaction force which is set up therein, counteracts the anti-clockwise bending moment created by the weight of the sleeve 18, about track 32.

FIG. 3 more clearly depicts the geographical location of the respective groups of rollers 26, 28, 30 and tracks 32, 34.

Friction pads, (not shown) could be substituted for the rollers.

What we claim is:

1. In a jet propelled aircraft:
   aircraft structure including a fuselage and a stub wing-like member projecting generally horizontally from the fuselage;
   a gas turbine engine having an exhaust nozzel with an exhaust outlet, said gas turbine engine being supported in generally horizontally spaced cantilever relationship to said fuselage;
   an annular ejector sleeve movable between an upstream position where it surrounds the gas turbine engine and a downstream position where its upstream end just overlaps a plane of the exhaust outlet in radial spaced relationship to the exhaust nozzle; and
   support means for supporting said ejector sleeve independently of said gas turbine engine in generally horizontally spaced cantilever relationship to said fuselage, said support means comprising an arm rigidly attached to one end to said ejector sleeve and projecting generally horizontally therefrom and having a free end, a pair of generally horizontally spaced, longitudinally extending, a parallel tracks supported on said stub wing-like member with one of said tracks being positioned closer to said ejector sleeve than the other said tracks, said one track positioned closer to said ejector sleeve having upwardly facing, downwardly facing, outwardly facing and inwardly facing bearing surfaces, said other of said tracks having a downwardly facing bearing surface, a first group of four rollers mounted on said arm adjacent the regidly connected end thereof for respectively engaging the bearing surfaces of said one of said tracks to prevent said ejector sleeve bodily rotating in planes which contain its longitudinal axis, and at least one roller mounted on the free end of said arm and engaging the downwardly facing bearing surface of said other track for counteracting any bending moment exerted by the weight of the ejector sleeve on the said one track.

2. The combination as claimed in claim 1 including a second group of four rollers mounted on said arm adjacent the regidly connected end thereof, said group of four rollers respectively engaging the bearing surfaces of said one of said tracks at spaced longitudinal positions thereon with respect to said first group of four rollers.

* * * * *